No. 822,156. PATENTED MAY 29, 1906.
C. E. SARGENT.
FARM GATE.
APPLICATION FILED MAR. 12, 1906.

2 SHEETS—SHEET 1.

ATTEST.
H. J. Fletcher
M. P. Smith

INVENTOR.
CHARLES E. SARGENT
BY
Higdon &
Longan
ATTY'S.

No. 822,156. PATENTED MAY 29, 1906.
C. E. SARGENT.
FARM GATE.
APPLICATION FILED MAR. 12, 1906.
2 SHEETS—SHEET 2.
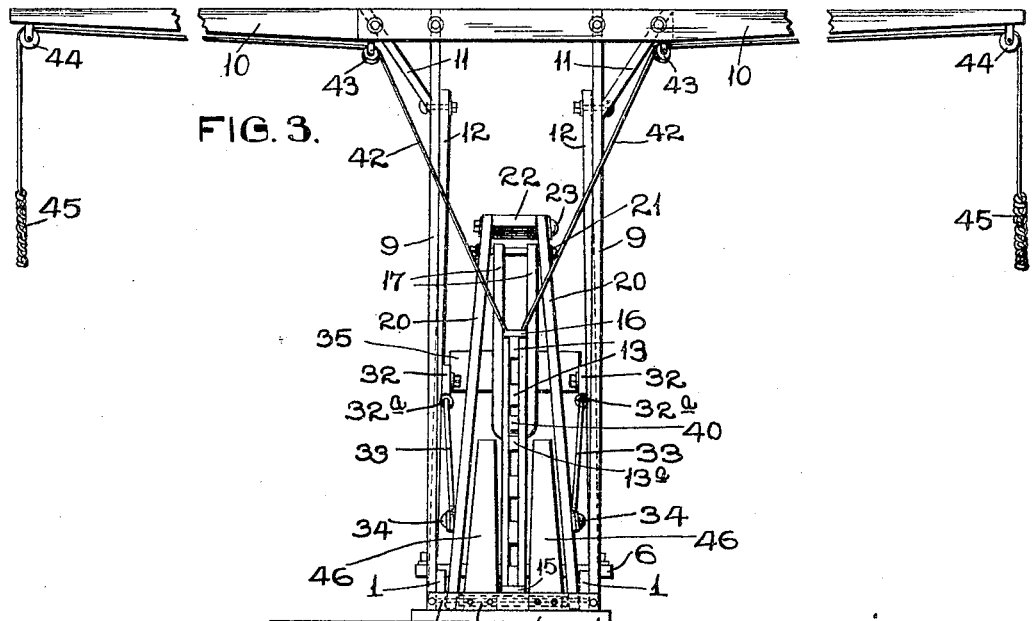
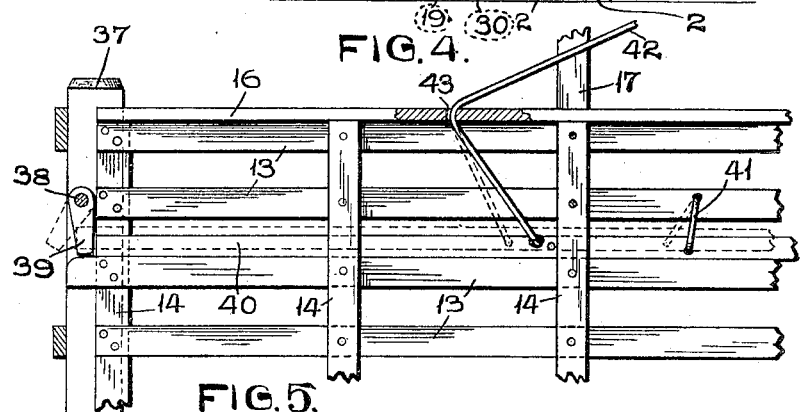
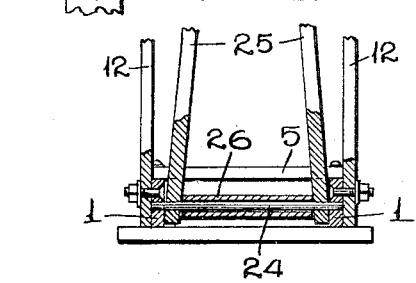
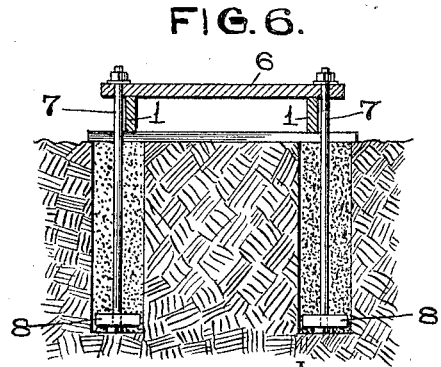
ATTEST.
H. J. Fletcher
W. P. Smith
INVENTOR.
CHARLES E. SARGENT.
BY Higdon & Longan
ATT'YS.

UNITED STATES PATENT OFFICE.

CHARLES E. SARGENT, OF GREENVILLE, ILLINOIS.

FARM-GATE.

No. 822,156. Specification of Letters Patent. Patented May 29, 1906.

Application filed March 12, 1906. Serial No. 305,593.

*To all whom it may concern:*

Be it known that I, CHARLES E. SARGENT, a citizen of the United States, and a resident of Greenville, Bond county, Illinois, have invented certain new and useful Improvements in Farm-Gates, of which the following is a specification containing a full, clear, and exact description, reference being had to the accompanying drawings, forming a part hereof.

My invention relates to a farm-gate; and the object of my invention is to construct a simple, inexpensive, and easily-operated gate which may be quickly opened or closed with little exertion and which gate when closed is positively held against being opened by animals.

A further object of my invention is to construct an inexpensive gate adapted for farm use and which is arranged to be opened and closed by a person seated in a vehicle.

A further object of my invention is to construct a farm-gate wherein all of the parts are very rigidly connected and braced, so as to overcome all tendency to shift out of operative alinement by reason of wind or other source of undue strain.

To the above purposes my invention consists of certain novel features of construction and arrangement of parts, which will be hereinafter more fully set forth, pointed out in my claims, and illustrated in the accompanying drawings, in which—

Figure 1 is a side elevation of a gate of my improved construction, with dotted lines showing the gate swung into an open position. Fig. 2 is a plan view of the gate seen in Fig. 1. Fig. 3 is an end elevation of the gate. Fig. 4 is a detail elevation, partly in section, of the upper portion of the forward end of the gate, showing the gate-latch. Fig. 5 is a vertical section taken on the line 5 5 of Fig. 1. Fig. 6 is a vertical section taken on the line 6 6 of Fig. 2.

The base of the fixed frame of my improved gate comprises a pair of sills 1, arranged parallel with each other and supported at their forward ends by a cross-piece 2, which rests on the ground, and said sills are supported adjacent their rear ends by a similar cross-piece 3.

The rear lower corners of the sills 1 are rounded, as indicated by 4, in order that they may be readily dragged over the ground should it be necessary to shift the gate to make a larger gate-opening.

The rear ends of the sills 1 are framed together by a cross-piece 5, and arranged transversely on said sills near their forward ends is a cross-piece 6, the ends of which extend slightly beyond said sills.

Passing vertically through the extended ends of this cross-piece 6 are the upper ends of anchor-bolts 7, which extend a suitable distance downwardly into holes formed in the ground beneath the sills, and the lower ends of said anchor-bolts are provided with blocks 8. After these anchor-bolts have been properly located the ground is tamped into the holes above the blocks 8, and thus the sills are very firmly anchored in position.

Fixed to and extending upwardly from the forward ends of the sills 1 are the parallel posts 9, and fixed to the upper ends thereof and extending outwardly in opposite directions are the horizontal arms 10.

Short braces 11 extend from the sides of the posts 9 outwardly and upwardly between the arms 10, and braces 12 are arranged at angles of approximately forty-five degrees and extend from points adjacent the cross-piece 5 on the sills 1 upwardly to the inside faces of the posts 9 opposite the lower ends of the braces 11. The ends of these braces 12 are rigidly secured to the sills 1 and to the posts 9.

The movable portion of the gate comprises a series of horizontally-arranged bars 13, framed together by the vertically-arranged bars 14.

A board 15 lies flat against and is fixed to the under side of the lower bar 13, and a corresponding bar 16 lies flat upon and is fixed to the top of the upper bar 13.

Fixed to and extending upwardly from the bars 14 at the center of the gate is a pair of bars 17, and a corresponding pair of bars 18 are fixed to and extend upwardly from the bars 14 at the rear end of the gate.

Journaled in and arranged transversely between the forward ends of the sills 1 is a rod 19, upon which, just inside the sills 1, are journaled the lower ends of a pair of swinging bars 20, the same extending upwardly and forwardly at angles of approximately forty-five degrees, and said swinging bars are journaled adjacent their upper ends on a bolt 21, which passes transversely through the upper ends of the bars 17.

The upper ends of the bars 20 extend a slight distance beyond the bolt 21, and between said ends is a filler-block 22, and a bolt 23 passes through said ends and said filler-block to rigidly unite the upper ends of the arms 20. This arrangement provides for a very tight rigid construction of the swinging arms.

Extending transversely between the sills 1, with its ends journaled therein and bearing against the lower ends of the braces 12, is a rod 24, on which are journaled the lower ends of a pair of swinging arms 25, identical in size and construction with the arms 20. A tube 26 is located upon this rod 24 between the lower ends of the arms 25 and serves as a spacer to maintain the ends of the swinging arms against the sills 1.

The upper ends of the swinging arms 25 are journaled on a bolt 27, which passes transversely through said arms and the upwardly-projecting arms 18 at the rear end of the gate.

A spacing-lock 28 is placed between the extreme upper ends of swinging arms 25, and passing through said ends and said block is a bolt 29, thus rigidly uniting the upper ends of the swinging arms 25.

A spacing-tube 30, identical with the spacing-tube 26, is placed on the rod 19 between the lower ends of the swinging arms 20.

Fulcrumed to each of the braces 12 by means of a bolt 31 is a horizontally-disposed weight-lever 32, and the forward ends of these levers terminate at the posts 9.

Fixed in the under side of the forward end of each weight-lever is an eye 32$^a$, and to each eye is loosely connected the upper end of a rod 33, the lower end of which is pivotally connected to the corresponding one of the swinging arms 20 by means of a pin or bolt 34.

The weight-levers 32 extend rearwardly a sufficient distance to clear the rear end of the gate when the same is swung in an open position, and positioned between the extreme rear ends of said weight-levers is a box 35, rigidly held in position by a bolt 36, passing transversely through the rear ends of the weight-levers and said box.

A suitable weight, such as sand, is located in the box 35 and serves to counterbalance the weight of the gate when the same swings into open or closed position.

37 designates a pair of posts against which the forward end of the gate closes, and pivotally arranged between said posts, upon a horizontally-arranged bolt 38, is a gravity-latch 39.

One of the horizontal bars 13 is extended at its forward end, as indicated by 13$^a$, and said extended end normally lies immediately below the gravity-latch 39, and when so positioned the gate cannot be opened until said latch is swung outwardly to allow the extended end 13$^a$ to swing rearwardly and upwardly as the gate opens.

On top of the bar 13, that is provided with this extended end 13$^a$, is a latch-opening bar 40, which is held between the vertical bars 14 and is pivotally connected to the adjacent upper bar 13 by a link 41.

42 designates flexible cords or cables the lower forward ends of which are secured in any suitable manner to the latch-opening bar 40 at a point just in front of the lower ends of the bars 17, and from thence said cords extend upwardly and forwardly through suitably-located apertures 43 in the top board 16 and from thence over grooved pulleys 43 and 44, depending from braces 11 and the outer ends of arms 10, and are then provided with suitable handles 45.

Positioned in the open spaces between the rear end of the gate and the planes in which the arms 20 travel are posts 46, which are for the purpose of preventing the passage through said spaces of small animals, and in addition thereto said posts serve as guides to prevent any lateral movement of the gate while swinging from one position to another.

The operation of my improved gate is as follows: The person approaching the gate pulls one of the handles 45, which swings the unlatching-bar 40 against the latch 49, as shown by dotted lines in Fig. 4, and releases the gate. As the pull upon the cord continues the entire gate is lifted upwardly away from the posts 37, and owing to the arrangement of the swinging bars 20 said gate will swing upwardly between the posts 9 and from thence will swing rearwardly and downwardly into the position seen by dotted lines in Fig. 1, with the board 15 resting upon the cross-pieces 5 and 6 and the front end of the gate in a position between the posts 9.

During the time the gate shifts from one position to another the weight-levers 32 will swing upon their fulcrums, and the rear ends of said levers carrying the box 35 will first move downwardly and then upwardly, following the movement of the gate, and thus said weight tends to counterbalance the weight of the gate during its swinging movement.

After passing through the gate the operator engages the opposite handle 45 and pulls the same downwardly to lift the gate from its open position and swing it over into a closed position, during which action the movements of the various parts of the gate, as just described, are reversed.

As the gate closes, the extended end 13$^a$ moves the latch 39 outwardly, after which said latch resumes its normal position above said extension 13$^a$, and thus the gate is held in a locked position.

There are no wooden posts or parts located in the ground, which location tends to decompose wood, and the anchor-bolts very rigidly anchor the frame of the gate in proper position.

Should it be desired to move the entire gate and frame, the nuts on the upper ends of the anchor-bolts 7 are removed, and after the cross-piece 6 is removed the framework and the gate may be pulled rearwardly by suitable power applied to the rear ends of the sills 1, which act as runners while the gate is being so moved.

A gate of my improved construction is simple, strong, and durable, is easily and quickly shifted from one position to another, is constructed of material which may be readily obtained at any lumber-yard, and when closed the gate is effectively locked.

I claim—

1. In a farm-gate, a pair of sills, a frame fixed to and supported upon said sills, a gate supported by and arranged to swing through said frame, means whereby said gate is swung from one position to another, a cross-piece positioned on the sills the ends of which extend beyond said sills, anchor-rods passing through the extended ends of the cross-piece and extending downwardly into the earth below the sills, and blocks located upon the lower ends of said rods; substantially as specified.

2. In a farm-gate, a frame, a gate supported by and arranged to swing through said frame, means whereby said gate is shifted from one position to another, a pair of parallel levers fulcrumed in the frame, links connecting the forward ends of said levers with the gate-shifting mechanism, a weight-box rigidly connecting the rear ends of said levers, and filler-stakes positioned between the sides of the frame and the sides of the gate, which stakes act as guides for the gate during its swing from one position to another; substantially as specified.

3. In a farm-gate, a pair of sills, a cross-piece located on top of said sills the ends of which cross-piece are extended, anchor-rods passing through the extended ends of the cross-piece and being extended into the ground beneath the sills, blocks located on the lower ends of said rods, a frame fixed to and supported by the sills, a gate supported by and arranged to swing through the frame, means whereby said gate is shifted from one position to another, a pair of parallel levers fulcrumed in the frame, links connecting the forward ends of said levers with the gate-shifting mechanism, and a weight-box rigidly uniting the rear ends of the levers; substantially as specified.

In testimony whereof I have signed my name to this specification in presence of two subscribing witnesses.

CHARLES E. SARGENT.

Witnesses:
M. P. SMITH,
EDWARD E. LONGAN.